United States Patent Office 3,271,347
Patented Sept. 6, 1966

3,271,347
PRINTING INK BASED ON ACRYLIC OR METHACRYLIC ACID COPOLYMERS AND POLYOXYETHYLENE
Elihu J. Aronoff, Glen Oaks, N.Y., and Paul D. Whyzmuzis, Clifton, N.J., assignors to Interchemical Corporation, New York, N.Y., a corporation of Ohio
No Drawing. Filed Jan. 31, 1964, Ser. No. 341,744
11 Claims. (Cl. 260—31.4)

This invention relates to novel printing inks in which bronzing has been sharply curtailed or substantially eliminated.

Bronzing is an undesirable effect occurring in printed matter of many inks. It may be described as being caused by the strong reflection of a narrow band of wave lengths of light from the surface of the pigment in the printed matter. This is observed as a vivid glare. Red pigments tend to give a golden-yellow bronze when exposed to white light; yellow pigments give a bluish bronze which may pass unnoticed under ordinary circumstances and blue pigments give bronzes which may vary from reddish purple to bright orange.

We have now found that bronzing may be substantially eliminated by the use in the ink of a combination of a binder resin made by addition polymerization containing from 4% to 25% of acid monomers and a polyoxyethylene. Two classes of resins have been found to be particularly effective in this invention.

(1) Copolymers of preferably from 70 to 85% vinylidene chloride and at least 15% of acrylic acids or itaconic acid of the type described in copending application Serial No. 341,701 entitled, "Novel Compositions of High Vinylidene Chloride-Content Copolymers," in the names of R. Bolstad, E. Aronoff, P. D. Whyzmuzis and E. Maloney, filed on or about the same date as the present application give excellent results. These copolymers are generally low in molecular weight, having molecular weight in the range of 3,000 to 5,000. As used in this specification, the term acrylic acids is meant to include both acrylic and methacrylic acids.

In adition to the vinylidene chloride and acid components in the proportions described above, the novel copolymers of the copending application may further contain any of a wide variety of olefinically unsaturated monomers. These olefinically unsaturated monomers may include nitriles, such as acrylonitrile and methacrylonitrile; the alkyl esters of acrylic and/or methacrylic acids such as ethyl hexylacrylate and lauryl acrylate but for best results lower alkyl acrylates are preferred (these are defined as the $C_1$ to $C_4$ alkyl esters of acrylic and/or methacrylic acids) such as methyl, ethyl, propyl and butyl acrylates as well as methyl methacrylate; alkyl esters of itaconic acid, particularly lower itaconic esters such as methyl itaconate, butyl itaconate, dimethyl itaconate and dibutyl itaconates; nitrogen-vinyl polymers such as N-vinyl-2-pyrrolidone; vinyl ketones such as methyl vinyl ketone, ethyl vinyl ketone and vinyl phenyl ketone; acrolein and methacrolein amides such as acrylamide, methacrylamide, methylolacrylamide, ethylene glycol monoacrylate and monomethacrylate, propylene glycol monoacrylate and monomethacrylate, glycerol monoacrylate; glycidyl acrylate and glycidyl methacrylate; styrene, alphamethyl styrene and the various vinyl toluenes; and ethylene glycol dimethacrylate.

(2) Copolymers of acrylic acids and acrylic ester materials having the formula

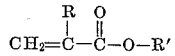

where R is a member selected from the group consisting of hydrogen, methyl and ethyl and R' is an alkyl radical of from 1 to 6 carbons are also effective in this invention. The acrylic acid preferably constitutes from 2 to 25% and most preferably from 4 to 10% of the copolymer with the remainder being the acrylic ester. Among the suitable esters are methyl, ethyl, propyl and butyl acrylates, methyl methacrylate, ethyl hexylacrylate and ethyl methacrylate.

It should be noted that in the present specification and claims, all proportions are by weight unless otherwise set forth.

The polyoxyethylene may be polyethylene glycol, preferably having a molecular weight of from 200 to 1,000, the mono- and diesters of $C_{12}$ to $C_{18}$ fatty acids and polyethylene glycol, including the oleic, stearic and lauric acid esters, and polyoxyethylene ethers of aliphatic alcohols such as methyl, ethyl, propyl and butyl alcohols and similar polypropylene glycol ethers. In addition copolymers of the oxypropylene repeating unit

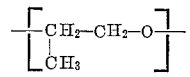

and oxyethylene may be used.

The proportions of the polyoxyethylene with respect to the resin have been found to be important to the practice of this invention. If too little polyoxyethylene is used, it is difficult to achieve a substantial reduction in bronzing. On the other hand, if too much polyoxyethylene is used, the inks have been found to lose their hardness and rub resistance. Preferably the ink is formulated so that from 2 to 12 oxyethylene groups are present for each carboxyl group present in the acrylic acid copolymer resin.

The inks of this invention may contain any of the wide variety of conventional ink pigments, particularly of course, pigments which tend to display undesirable bronzing.

The solvents may be any of the conventional solvents used in inks including aliphatic solvents such as high and low boiling petroleum distillates; aromatic solvents such as benzene, toluene and xylene; alcohols such as methanol and isopropanol; ketones such as methyl ethyl ketone, acetone an methyl isobutyl ketone as well as esters such as ethyl acetate and isopropyl acetate. As is indicated in the above mentioned copending application, the vinylidene chloride-acrylic acid copolymers may be used in any of the above solvents or in combinations thereof. The acrylic ester-acrylic acid copolymers are preferably used in aromatic hydrocarbon solvents, ketone solvents or ester solvents.

One skilled in the art will readily be able to select the most suitable polyoxyethylene to use in combination with the particular resin and solvent. For example, if one wishes to use a solution of a copolymer of 90% butyl acrylate and 10% acrylic acid in toluene as a vehicle, he would preferably select as his polyoxyethylene component an ester of polyethylene glycol, e.g., polyethylene glycol monolaurate which is highly soluble in toluene over polyethylene glycol which does not have such solubility.

Both the resin and the pigment are used in conventional proportions in the ink of this invention. The resin may preferably constitute from 10 to 35% of the ink weight while the pigment may preferably constitute from 10 to 60% of the ink weight.

Example 1

| | Parts by weight |
|---|---|
| Vinylidene chloride | 75 |
| Acrylic acid | 25 |
| n-Propyl acetate | 54 |
| Lauryl peroxide | 3 |

The above ingredients are placed in a kettle and maintained at a temperature of 60° C. under an inert atmosphere for 17 hours with continuous agitation. There is a 100% conversion of monomeric material to the copolymer.

*Example 2*

| | Parts by weight |
|---|---|
| The copolymer solution of Example 1 | 31.0 |
| Ethanol | 45.0 |
| Microcrystalline wax | 1.0 |
| Calcium lithol red pigment | 15.0 |
| Polyethylene glycol having a molecular weight of 200 (Carbowax 200) | 8.0 |

The ink is printed upon cellophane using a flexographic press. The printing has excellent hardness, flexibility and rub resistance. Also it displays excellent adhesion to the substrate and no bronzing.

*Example 3*

Example 2 is repeated using the same conditions, ingredients and proportions except that the Carbowax 200 is eliminated. There is a marked downgrading in adhesion and considerable bronzing in the printed film.

*Example 4*

In order to determine the effectiveness of polyethylene glycol esters in preventing bronzing, Example 2 is repeated using the same conditions, ingredients and proportions except that in place of the Carbowax 200 the following mono and diesters of polyethylene glycol and $C_{12}$ to $C_{18}$ fatty acid are respectively used:

(a) The monester of polyethylene glycol M.W. 600 and lauric acid.
(b) The diester of polyethylene glycol M.W. 400 and lauric acid.
(c) The monoester of polyethylene glycol M.W. 400 and oleic acid.
(d) The diester of polyethylene glycol M.W. 400 and oleic acid.
(e) The monoester of polyethylene glycol M.W. 400 and stearic acid.
(f) The diester of polyethylene glycol M.W. 1000 and stearic acid with the number of parts of glycol ester being increased to 20.

Printed films of all of these inks displayed substantially no bronzing.

*Example 5*

The following ingredients are mixed to form an ink:

| | Parts by weight |
|---|---|
| A solution (61% solids content) in ethanol of a copolymer of 95.7% ethyl methacrylate and 4.3 methacrylic acid | 31.0 |
| Ethanol | 25.0 |
| n-Propyl acetate | 23.0 |
| Microcrystalline wax | 1.0 |
| Phthalocyanine blue pigment | 15.0 |
| Pluronic F68 (a copolymer of oxyethylene and oxypropylene having an oxyethylene content of 80%, an oxypropylene content of 20% and a molecular weight of 1750) | 5.0 |

The ink is used in printing upon glassine film. The printing has excellent hardness, flexibility and rub resistance as well as substantially no bronzing.

*Example 6*

Example 5 is repeated using the same ingredients, proportions and conditions except that in place of Pluronic F68, there is used the monoester of oleic acid and polyethylene glycol having a molecular weight of 1000. The resulting printing is about the same as that Example 5, particularly with respect to the elimination of bronzing.

*Example 7*

Example 5 is repeated using the same ingredients, proportions and conditions except that in place of the copolymer of ethyl methacrylate and methacrylic acid, there is used a copolymer of 93% butylacrylate and 7% methacrylic acid. The resulting printing is about the same as that of Example 5.

*Example 8*

Example 5 is repeated using the same ingredients, proportions and conditions except that in place of the copolymer of ethyl acrylate and methacrylic acid, there is used a copolymer of 95% ethyl acrylate and 7% methacrylic acid. The resulting printing is about the same as that of Example 5.

*Example 9*

The following ingredients are mixed to form an ink.

| | Parts by weight |
|---|---|
| A 64.4% solution in n-propyl acetate of a copolymer of 75% vinylidene chloride, 20% acrylic acid and 5% acrylonitrile made in accordance with the procedure of Example 1 | 31.0 |
| Ethanol | 45.0 |
| Microcrystalline wax | 1.0 |
| Calcium lithol red pigment | 15.0 |
| Polyethylene glycol having a molecular weight of 200 | 8.0 |

This ink is printed upon Mylar film (polyethylene terephthalate). The printing has excellent hardness, flexibility and rub resistance. Also, it displays excellent adhesion to the substrate and no bronzing.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the ture spirit and scope of the invention.

What is claimed is:

1. An acrylic acid copolymeric ink composition comprising (1) pigment dispersed in (2) a volatile organic solvent solution of (3) a copolymer or from 4 to 25% of an acrylic acid selected from the group consisting of acrylic acid and methacrylic acid and the remaining monomeric material comprising a member selected from the group consisting of vinylidene chloride and acrylic ester material having the formula

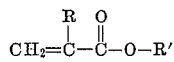

where R is a member selected from the group consisting of hydrogen methyl and ethyl and R' is an alkyl radical of from 1 to 6 carbons said vinylidene chloride member being at least 70% of the copolymer and said acrylic ester member being at least 90% of the copolymer and (4) polyoxyethylene containing from 2 to 12 oxyethylene groups for each carboxyl group present in the acrylic acid copolymer.

2. The ink of claim 1, wherein said polyoxyethylene further contains oxypropylene groups.

3. The ink of claim 1 wherein said copolymer comprises 70 to 80% vinylidene chloride and at least 15% of an acrylic acid.

4. The ink of claim 3 wherein said acrylic acid is methacrylic acid.

5. The ink of claim 1 wherein said copolymer comprises at least 90% of the acrylic ester material and the remainder an acrylic acid.

6. The ink of claim 5 wherein said acrylic acid is methacrylic acid.

7. The ink of claim 1 wherein said polyoxyethylene is polyethylene glycol having a molecular weight of from 200 to 1000.

8. The ink of claim 1 wherein said polyoxyethylene is an ester of polyethylene glycol having a molecular weight of from 200 to 1000 and an acid selected from the group consisting of $C_{12}$ to $C_{18}$ fatty acids.

9. The ink of claim 8 wherein said acid is oleic acid.

10. The ink of claim 8 wherein said acid is stearic acid.

11. The ink of claim 8 wherein said acid is lauric acid.

References Cited by the Examiner

UNITED STATES PATENTS

| 2,623,827 | 12/1952 | Moos | 106—23 |
| 3,068,183 | 12/1962 | Strolle | 260—33.4 |
| 3,070,564 | 12/1962 | Roeser. | |
| 3,162,611 | 12/1964 | Varron et al. | 260—31.4 |

MORRIS LIEBMAN, *Primary Examiner.*

L. T. JACOBS, *Assistant Examiner.*